(12) United States Patent
Barnes et al.

(10) Patent No.: US 8,195,638 B1
(45) Date of Patent: *Jun. 5, 2012

(54) WEB LOG FILTERING

(75) Inventors: James D. Barnes, Overland Park, KS (US); Dan O'Connor, Lee's Summit, MO (US); Dora Potluri, Plano, TX (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/080,190

(22) Filed: Apr. 5, 2011

Related U.S. Application Data

(63) Continuation of application No. 12/018,194, filed on Jan. 22, 2008, now Pat. No. 7,945,556.

(51) Int. Cl.
*G06F 17/30* (2006.01)

(52) U.S. Cl. ......... 707/709; 707/710; 707/754; 707/758

(58) Field of Classification Search .................. 707/709, 707/710, 754, 758
See application file for complete search history.

(56) References Cited

U.S. PATENT DOCUMENTS

| | | | |
|---|---|---|---|
| 6,081,900 A * | 6/2000 | Subramaniam et al. | 726/19 |
| 7,146,416 B1 * | 12/2006 | Yoo et al. | 709/224 |
| 7,886,047 B1 | 2/2011 | Potluri | |
| 7,945,556 B1 | 5/2011 | Barnes et al. | |
| 2001/0025275 A1 | 9/2001 | Tanaka et al. | |
| 2001/0054035 A1 | 12/2001 | Lee | |
| 2002/0161648 A1 * | 10/2002 | Mason et al. | 705/14 |
| 2003/0046311 A1 | 3/2003 | Baidya et al. | |
| 2004/0049702 A1 * | 3/2004 | Subramaniam et al. | 713/201 |
| 2004/0068665 A1 | 4/2004 | Fox et al. | |
| 2005/0149396 A1 * | 7/2005 | Horowitz et al. | 705/14 |
| 2006/0004850 A1 * | 1/2006 | Chowdhury | 707/103 R |
| 2006/0161961 A1 * | 7/2006 | Brotz et al. | 725/113 |
| 2008/0183664 A1 | 7/2008 | Cancel et al. | |
| 2009/0222329 A1 | 9/2009 | Ramer et al. | |
| 2010/0057560 A1 | 3/2010 | Skudlark et al. | |

OTHER PUBLICATIONS

FAIPP Pre-Interview Communication dated May 12, 2010, U.S. Appl. No. 12/018,194, filed Jan. 22, 2008.
Office Action dated Sep. 14, 2010, U.S. Appl. No. 12/018,194, filed Jan. 22, 2008.
Notice of Allowance dated Jan. 25, 2011, U.S. Appl. No. 12/018,194, filed Jan. 22, 2008.
Office Action dated Mar. 30, 2010, U.S. Appl. No. 12/169,630, filed Jul. 8, 2008.
Notice of Allowance dated Sep. 22, 2010, U.S. Appl. No. 12/169,630, filed Jul. 8, 2008.
Supplemental Notice of Allowability dated Oct. 15, 2010, U.S. Appl. No. 12/169,630, filed Jul. 8, 2008.

* cited by examiner

*Primary Examiner* — Shahid Alam
*Assistant Examiner* — Andalib Lodhi

(57) ABSTRACT

Computer implemented methods and systems are provided for web log filtering. A uniform resource locator (URL) is identified for a resource requested by an identified device. The URL is stored unless the URL has at a reference to an advertisement or an extension that matches any of a list of extensions specified for storage exclusion. The stored URL is categorized based on either the stored URL or an included domain name, depending on whether the included domain name matches any of the list of domain names that are associated with multiple categories. A count is incremented in a web log category associated with the identified device based on the categorized stored URL.

19 Claims, 7 Drawing Sheets

200

```
<!DOCTYPE html PUBLIC "-//W3C//DTD XHTML 1.0 Transitional//EN"
            "http://www.w3.org/TR/xhtml1/DTD/xhtml1-transitional.dtd">
<html xmlns="http://www.w3.org/1999/xhtml" xml:lang="en" lang="en">
<head>
<meta http-equiv="Content-type" content="text/html; charset=iso-8859-1"/>
<title>Welcome to Company - Cell Phones, Mobile Phones, Plans for Personal and Business Wireless</title>
<link rel="stylesheet" href="/assets/styles/common.css" type="text/css" />
<link rel="stylesheet" href="/assets/styles/REVIII.css" type="text/css" />
<script src="/assets/scripts/tools.js" type="text/javascript"></script>
<script src="/assets/scripts/nextel_functions.js" type="text/javascript"></script>
<script src="/assets/scripts/rev_cookies.js" type="text/javascript"></script>
<script src="/assets/scripts/rev.js" type="text/javascript"></script>
<script src="/assets/scripts/flashobject.js" type="text/javascript"></script>
</head>
<body>
<div id="mainCont">
  <div id="head">
  <!-- head_code_here -->
                         <div class="gridBody">
       <div id="navI">
         <ul>
           <li    class="first"><a          202  href="/business/"
target="_top">Business</a></li>
                  <li><a        href="http://www.companystorelocator.ext/?lang=en"
target="storeLocatorPopUp"   popup="width=650,   height=440,   top=0,
left=0,toolbar=no,menubar=no,scrollbars=yes, resizable=yes">Find a Store</a></li>
                  <li><a        href="http://www2.company.ext/mr/aboutcompany.do"
target="_top">About Us</a></li>
                  <li><a href="/contactus/" target="_top">Contact Us</a></li>
                  <li><a    href="/index_es.html?language=ES"    target="_top">En
Español</a></li>
                                                                 204
         </ul>
       </div>
       <div>
       <div                                              id="learnMore"><a
href="http://www.companyahead.ext/?id12=UHPCHP_Billboard_CompanyAhead_LearnMore"><img
src="/assets/images/common/txt_learnMore_btn.gif" /></a></div>
```

Fig. 2

302 — company.ext/business
304 — company.ext /careers
306 — company.ext /contactus
308 — investors. company.ext
310 — companystorelocator.ext/companylocator/searchfrom.jsp
312 — news.ext/
314 — johnsmith.portal.ext
316 — sf3.us302.mail.emailserviceprovider.ext

| Index Number | Index Description | Identified Devices |
|---|---|---|
| 0 | 0-24% | |
| 1 | 25-49% | |
| 2 | 50-74% | |
| 3 | 75-99% | |
| 4 | 100-149% | |
| 5 | 150-199% | |
| 6 | 200-249% | |
| 7 | 250-299% | |
| 8 | 300-349% | |
| 9 | 350-399% | |
| 10 | 400-449% | |
| 11 | 450-499% | |
| 12 | 500-599% | |
| 13 | 600-699% | |
| 14 | 700-799% | |
| 15 | 800-899% | |
| 16 | 900-999% | |
| 17 | 1000+% | |

| Identified Device | |
|---|---|
| Category: Music | |
| Time | Count |
| Day 0 | |
| Day 1 | |
| Day 2 | |
| Day 3 | |
| Day 4 | |
| Day 5 | |
| Day 6 | |
| Day 7 | |
| Week 0 | |
| Week 1 | |
| Week 2 | |
| Week 3 | |
| Week 4 | |
| Month 0 | |
| Month 1 | |
| Month 2 | |
| Month 3 | |
| Month 4 | |
| Month 5 | |
| Month 6 | |
| Year 0 | |
| Year 1 | |
| Lifetime | |

Fig. 5

WEB LOG FILTERING

CROSS-REFERENCE TO RELATED APPLICATIONS

This application is a continuation of and claims priority to U.S. patent application Ser. No. 12/018,194, entitled "Web Log Filtering", now issued as U.S. Pat. No. 7,945,556 filed on Jan. 22, 2008, issued on May 17, 2011, which is incorporated herein by reference for all purposes.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile devices include applications, such as web browsers, that can request content from providers, such as website servers. Content providers can enable advertisers to supplement the requested content with advertisements. In general, pay higher prices for advertisements that reach specific intended audiences because targeted advertisements may increase the chances of favorable responses to the advertisement.

For example, an advertisement provider designs a music download advertisement for mobile device users. Mobile device users who previously purchased and downloaded music are likely to have sufficient interest and sufficient disposable income to respond favorably to the advertisement. However, the advertiser provider may not want to pay to send this advertisement to numerous mobile device users who have not purchased and downloaded music, because these mobile device users are not as likely to have sufficient interest to respond favorably to the advertisement. Therefore, advertisers would want to send such advertisements to targeted mobile device users.

SUMMARY

The present disclosure provides computer implemented methods and systems for web log filtering. In some embodiments, a uniform resource locator (URL) is identified for a resource requested by an identified device. The URL is stored unless the URL references an advertisement or the URL has an extension that matches any of a list of extensions specified for storage exclusion. The stored URL is categorized based on the stored URL if the stored URL includes the domain name that matches any of the list of domain names that are associated with multiple categories. Otherwise, the stored URL is categorized based on the domain name. A count is incremented in a web log category associated with the identified device based on the categorized stored URL.

In some system embodiments, the system includes a database and a server. The server identifies a URL for a resource requested by an identified device. The server stores the URL in the database unless the URL references an advertisement or the URL has an extension that matches any of a list of extensions specified for storage exclusion. The server also categorizes the stored URL based on the stored URL if the stored URL includes the domain name that matches any of the list of domain names that are associated with multiple categories. Otherwise, the server categorizes the stored URL based on the domain name. Moreover, the server increments a count in the database for a web log category associated with the identified device based on the categorized stored URL.

In some other embodiments, a URL is categorized based on the URL if the URL includes a domain name that matches any of the list of domain names that are associated with multiple categories. Otherwise, the URL is categorized based on the domain name. A count is incremented in a web log category associated with an identified device based on the categorized URL. A usage of an identified device is analyzed based on the web log category.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 2 is an illustration of a block diagram of source code for a web page.

FIG. 3 lists several uniform resource locators.

FIG. 4 illustrates a web log category count distribution in a database according to some embodiments of the present disclosure.

FIG. 5 illustrates a web log category history associated with an identified device according to some embodiments of the present disclosure.

DETAILED DESCRIPTION

Figure 1:
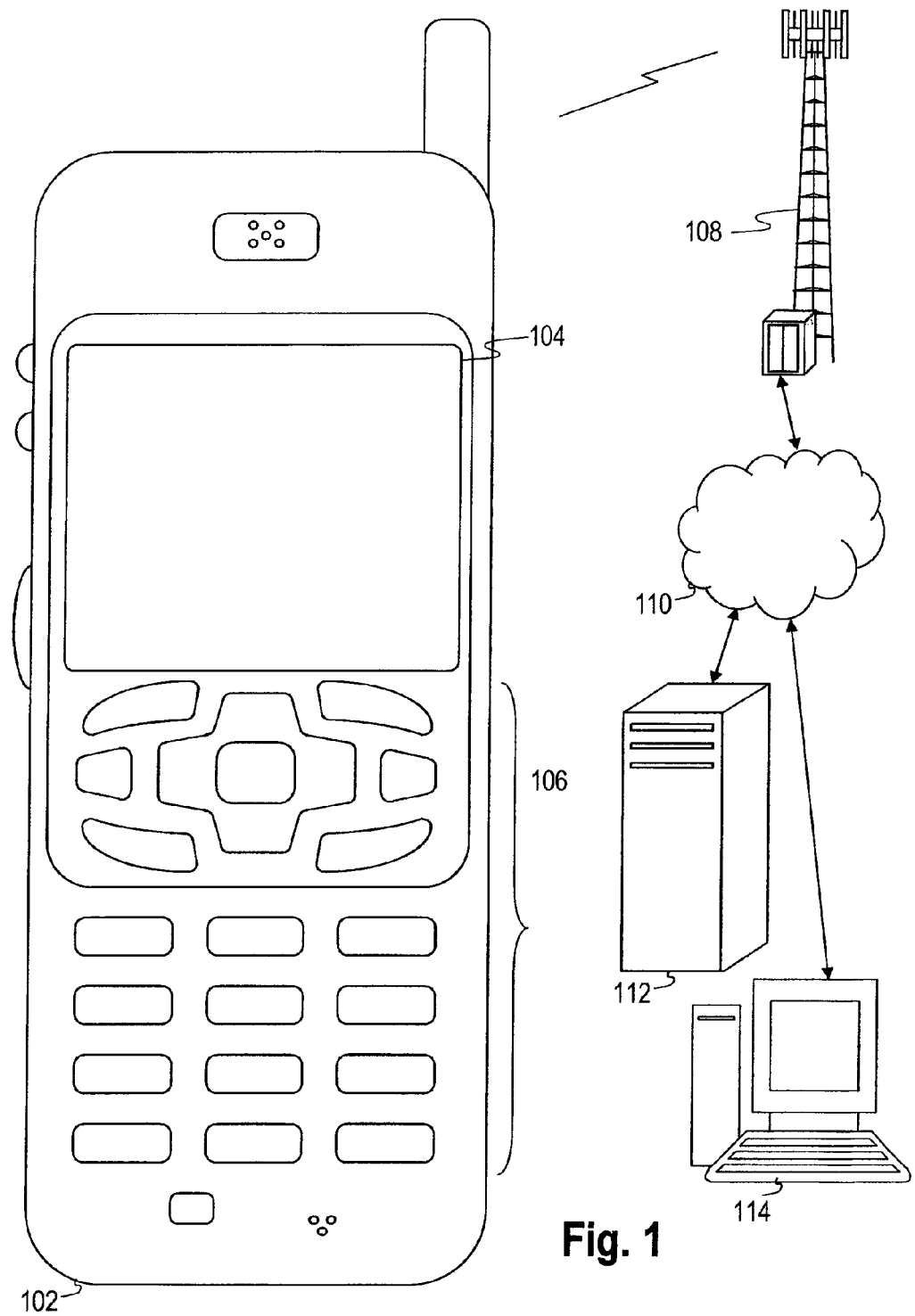
FIG. 1 is an illustration of a wireless communications system for web log filtering according to some embodiments of the present disclosure.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

A device user may use a browser to request a resource, such as a web page, from a website server. The web page may appear to be a monolithic logical unit when viewed by the device user, but many web pages may include some hypertext markup language (HTML) text, multiple images, and applets that provide streaming audio or video, many of which may be accessed as a separate resource. When a browser uses a URL to request a web page from a website server, the requested web page may include many different resources which also may be requested via their own URLs. When a website server responds to the browser that requested the web page by providing resources such as HTML text, images, and the like, the website server usually maintains a web log of the received request. The web log may provide information about a web page, such as how device users visit the web page, what the visitors see, and what products the visitors purchase. Each visitor may be identified either by the internet protocol (IP) address/domain name of the device that requested the resource, or by a cookie, which is a unique string that identifies each visitor. The web log may list visitors by number of visits, new versus returning visitors, authenticated or unauthenticated visitors, and most frequent visitor. The behavior of a particular visitor may be identified from different statistics, such as the most frequent paths taken, the most frequent web pages accessed, the most frequent entry/exit web pages from the website, how many times the visitor returns at a later time, and how much time a visitor is spending on the website.

However, a website server may not have any information about a new visitor to a website regarding previous websites visited, previous resources requested, or previous online purchases. Furthermore, the website server may not have any information about a returning visitor to the website server's web pages beyond information compiled during the returning visitor's previous visits to the website server's web pages. Therefore, a website server that supplements a web page with many types of advertisements from various advertisers typically has little or no information about which advertisements would best match a visitor based on the visitor's previous websites visited, previous resources requested, or previous online purchases.

Although a communication service provider may monitor communications between a customer device and websites to determine optimized advertisement targeting, many resource requests are not helpful in determining the intent for visiting a website, such as the text, multiple images, applets, and other resources that a website server provides in response to a request for a single web page. For example, if a customer device requests a web page from a news organization, a website server may respond with resources consisting of the requested web page and three unsolicited advertisements as supplements to the web page. When the communication server provider analyzes the resource requests between the customer device and the website server, three of the four resource requests are for unsolicited advertisements, which are not indicative of the device usage or purchasing tendencies of the device user. Furthermore, many mobile devices use browsers to access web pages indirectly, as the mobile device's small display screen may require the web page request to be initially routed to a transcoder. Transcoders may convert web pages designed for full-sized display screens to be displayed on the mobile device's small display screen. Analyzing a web page request from a mobile device may result in identifying the transcoder, not the requested web page, as the requested resource. Additionally, many URLs are lengthy character strings that are difficult to analyze to determine the intended resource requested by the mobile device.

The present disclosure provides computer implemented methods and systems for web log filtering. It may happen that some URLs that are accessed from the mobile device are of negligible interest and may be ignored or filtered, thereby saving processing load and/or improving the accuracy of URL hit counts. A server identifies URLs for resource requests, but does not determine categories for advertisers' URLs or the URLs with specific extensions. The server determines categories of interest for the rest of the URLs, and logs how often resources are requested based on each category of interest. The server may analyze the usage of each requesting device based on this logged data.

In some embodiments, a server identifies a URL for a resource requested by an identified device. Instead of storing each identified URL for further analysis, which would require greater storage capacity to store all of the URLs that are not helpful in determining a visitor's intent, the server analyzes each URL before determining whether to store the URL. Because the server does not store the URL if the URL references an advertisement, where the referencing may be by either domain name or keyword, the server does not store the numerous URLs associated with advertising. The server also does not store URLs that have extensions specified for storage exclusion, such as URLs with extensions for pictures or images, so that the sever does not store the numerous URLs whose extension may indicate that the URL does not need to be stored.

The server only has to analyze the stored URLs, which require less storage and analysis time than the large amount of identified URLs. Some domain names within the URLs may be associated with multiple categories of interest to advertisers, while other domain names within URLs may be associated with only a single category of interest. Therefore, the server may analyze each URL to determine if the URL includes a domain name that matches any of a list of domain names that are associated with multiple categories. For the URLs that include domain names that are associated with multiple categories, the server categorizes the stored URL based on the URL itself, which may include a keyword or a sub-domain that is associated with a specific category. For the URLs that do not include domain names that are associated with multiple categories, the server categorizes the stored URL based on the domain name included in the URL, where the domain name may be associated with a single category. After determining a category for the stored URL, the server increments a count in web logs based on the category and the identified device used to request the resource.

Instead of only providing information about visits to a particular website, such web logs may provide information about visits to categories of websites and information about each website visited by a particular device. The server may analyze the usage of each requesting device based on the web log categories. Advertisers may use analysis of the usage to target devices with advertisements that match the interests of the device user, whether the advertisements are supplements to requested web pages or unsolicited stand-alone advertisements sent directly to the device.

FIG. 1 shows a wireless communications system including the device 102. FIG. 1 depicts the device 102, which is operable for implementing aspects of the present disclosure, but the present disclosure should not be limited to these implementations. Though illustrated as a mobile phone, the device 102 may take various forms including a personal computer, a mobile telecommunication device, a mobile handset, a personal digital assistant (PDA), a mobile computer, a handheld gaming device, a wireless mobile device, a pager, a portable computer, a tablet computer, a laptop computer, a digital camera, a digital music player, and a digital calculator. Many suitable devices combine some or all of these functions. In some embodiments of the present disclosure, the device 102 is not a general purpose computing device like a portable, laptop or tablet computer, but rather is a special-purpose communications device such as a mobile phone, wireless handset, pager, or PDA. The device 102 may support specialized activities such as gaming, inventory control, job control, and/or task management functions, and so on.

The device 102 includes a display 104 and a touch-sensitive surface or keys 106 for input by a user. The device 102 may present options for the user to select, controls for the user to actuate, and/or cursors or other indicators for the user to direct. The device 102 may further accept data entry from the user, including numbers to dial or various parameter values for configuring the operation of the device 102. The device 102 may further execute one or more software or firmware applications in response to user commands. These applications may configure the device 102 to perform various customized functions in response to user interaction. Additionally, the device 102 may be programmed and/or configured over-the-air, for example from a wireless base station, a wireless access point, or a peer device 102.

The device 102 may execute a web browser application which enables the display 104 to show a web page. The web page may be obtained via wireless communications with a cell tower 108, a wireless network access node, a peer device 102 or any other wireless communication network or system. The cell tower 108 (or wireless network access node) is coupled to a wired network 110, such as the Internet. Via the wireless link and the wired network 110, the device 102 has access to information on various servers, such as a server 112. The server 112 may provide content that may be shown on the display 104. Alternately, the device 102 may access the cell tower 108 through a peer device 102 acting as an intermediary, in a relay type or hop type of connection. Additionally, an intelligent device 114, such as a desktop computer, a laptop computer, or a set-top box, is coupled to the wired network 110. Via the wired network 110, the intelligent device 114 has access to information on various servers, such as the server 112. Embodiments of the present disclosure may provide web log filtering for both wireless devises, such as the device 102, and wired devices, such as the intelligent device 114.

FIG. 2 illustrates exemplary source code 200 for a web page. Source code is a sequence of statements and/or declarations written in some human-readable computer programming language. The source code 200 may be some of the source code for the web page company.ext, including some HTML text and multiple images. In this example, "company" is the name of the enterprise responsible for the web page and "ext" is a file extension for the web page. For example, in addition to the HTML text for the web page company.ext, the source code 200 also lists many URLs, including URLs 202-204 that assist a visitor to request additional resources when selected. URL 202 includes "companystorelocator.ext," which enables visitors to geographically locate a company store that provides products and/or services. URL 204 includes "company.ext/mr/aboutcompany.do," which enables visitors to learn information about the company. If a request for the company.ext web page is analyzed for resource requests without filtering resources, the visitor that requested the company.ext web page may be identified as a visitor with an intent to find a company store and an intent to research Company's corporate earnings even though the visitor to company.ext may have only had the intent to download a new ring tone.

FIG. 3 shows a table of uniform resource locators. The URLs 302-316 illustrate various types of resource requests that may be analyzed by a server to determine the intent of a web page visitor. For example, company.ext/business 302, company.ext/careers 304, and company.ext/contactus 306 all include the domain name company.ext, followed by different character strings. When the server begins parsing a URL from left to right, the server first encounters company.ext, which is the domain name for the web page where each of the URLS 302-306 may be selected. The intent of a visitor to the company.ext web page may depend on which of the URLs 302-306 that the visitor selects, and this intent may be analyzed based on the server parsing the rest of the URL from left to right to encounter the character strings that follow company.ext/ in the selected URL. If the visitor to the company.ext web page selects company.ext/business 302, the visitor may have the intent to order company service for the visitor's employer. If the visitor to the company.ext web page selects company.ext/careers 304, the visitor may have the intent to investigate the possibility of working for the company. If the visitor to the company.ext web page selects company.ext/contactus 306, the visitor may have the intent to make an online payment.

The investors.company.ext 308 URL includes the domain name company.ext, similar to the URLs 302-306, but does not begin with the domain name company.ext, unlike the URLs 302-306. Analyzing resources requested via the company.ext web page may identify the intent of the visitor based on the character strings that follow the company.ext domain name for the URLs 302-306, but a different order of analysis is required for the URL 308. The server may retain the character string "investors," which precedes the domain name company.ext because the character string does not match any domain name. Upon parsing from left to right, the server encounters and recognizes the domain name company.ext. Using the domain name company.ext, the server may use the retained unmatched characters "investors" to analyze the intent of the visitor. If the visitor to the company.ext web page selects investors.company.ext 308, the visitor may have the intent to investigate the possibility of investing in the company.

Although the "companystorelocator.ext/companylocator/searchfrom.jsp" 310 URL may be accessed from the company.ext web page, the 310 URL does not include the company.ext domain name. Therefore, analysis of a resource request for the 310 URL requires a logic that is not dependent upon inclusion of the company.ext domain name. If the visitor to the company.ext web page selects the 310 URL, the visitor may have the intent to geographically locate a company store that offers products and services.

The news.ext 312 URL may be for a web page offered by a news organization that publishes many different types of news stories. The URLs for each of the different news stories may begin with news.ext 312, followed by different character strings that designate the different news stories. However, instead of differentiating between different types of news stories, an advertiser may want to identify a visitor to the news.ext 312 web page as a visitor with an interest in news, regardless of what types of news stories are subsequently requested. The johnsmithportal.ext 314 URL may be a personalized portal page for a visitor named John Smith. Analysis of the 314 URL may assist advertisers in targeting advertisements by focusing on the specific type of portal used, instead of focusing on the personal name of the visitor. The sf3.us302.mail.emailserviceprovider.ext 316 URL is an example of a resource used by an e-mail service provider. Analysis of the "us302" portion of the 316 URL may not assist an advertiser in targeting advertisements because "us302" may simply identify a web page that is randomly assigned for the temporary use of the visitor to the e-mail service provider web page.

FIG. 4 illustrates a web log category count distribution 400 in a database 402 according to some embodiments of the present disclosure. The distribution 400 may be used to categorize the tendencies of a visitor to various types or categories of web pages. The server 112 may maintain the distribution 400 in the database 402 for each category of web pages visited. The usage of each customer device serviced by a communication service provider may be analyzed based on the number of logged visits by the customer device to a specific category of web page compared to the average number of visits by other customer devices to the specific category of web page.

For example, if a communication service provider logs 10 visits by a customer device to music-oriented web pages in one day, and the average number of daily customer visits by other customer devices to music-oriented web pages is 8, then the customer device visited music-oriented web pages at a rate 125% (100%×10/8) compared to the average for other customer devices. The distribution 400 in the database includes columns for index number 404, index description 406, and identified devices 408. For the example of the music-oriented web page visitor, 125% corresponds to the range 100-149% in the index description 404 column in row 410. Because the row 410 also includes the value 4 in the index number 404 column, the value 4 may be logged in an individual log for the visitor as the index number 404 that describes the visitor's tendencies to visit music-oriented web pages.

The IP address or some other unique identifier for the visitor may be entered in the identified devices 408 column. For example, music advertisers may use the identified devices 408 column in targeting web page visitors who have high tendencies to visit music-oriented web pages. A music advertiser may send a music download advertisement only to identified devices corresponding to row 412 or higher, which are for customer devices that visit music-oriented web pages at a rate that is at least 500% compared to the average number of visits by other customer devices to music-oriented web pages.

FIG. 5 shows a block diagram of a web log category history 500 associated with an identified device according to some embodiments of the present disclosure. The history 500 may be used to log how often a customer device, such as the device 102, visited a particular type of web page over time. The server 112 may maintain the history 500 for each category of web page visited by the customer device. For example, identified device 502 lists a unique identifier for a particular customer device, while category: music 504 identifies the orientation of the web pages for the visit history, such as web pages where a visitor may purchase music for downloading. The history 500 may include a time 506 column and a count 508 column, which may be used for listing when the device visited music-oriented web pages and how often the device visited web pages within the specified time frame.

For example, day 0 is the current day, such that the count 508 for the same row as day 0 indicates the number of visits by the device to music-oriented web pages since midnight. Similarly, the count 508 for the same row as day 1 indicates the number of visits by the device to music-oriented web pages yesterday. The history 500 may list the number of visits for each day during the last week, the number of visits during the last week, the number of visits during the last month, the number of visits during the last year, and the number of visits during the entire lifecycle of the device. Instead of shifting all of the daily counts at the end of the current day, the identifiers for each of the days may be simply modified. For example, at midnight the cumulative count for day 0 is now identified as the count for day 1, the count previously identified for day 1 is now identified as the count for day 2, the count previously identified for day 2 is now identified as the count for day 3, and so on. The count previously identified for day 7 is zeroed out and now identified as the count for day 0. Alternatively, the counts for each of the days 0-6 may be individually transferred to become the counts for days 1-7, with the count for day 0 starting again at 0. As is well known to those skilled in the art, one way of changing the identity of a count may be to move the address or reference of the memory location of the count from a first variable—for example "day 1"—to a second variable—for example "day 2", or some similar change.

In another example, week 0 is the current week, such that the count 508 for the same row as week 0 indicates the number of visits by the device to music-oriented web pages since the previous Saturday at midnight. Similarly, the count 508 for the same row as week 1 indicates the number of visits by the device to music-oriented web pages last week. Instead of shifting all of the weekly counts at the end of the current week, the identifiers for each of the weeks may be simply modified. For example, on Saturday at midnight the cumulative count for week 0 is now identified as the count for week 1, the count previously identified for week 1 is now identified as the count for week 2, the count previously identified for week 2 is now identified as the count for week 3, and so on. The count previously identified for week 4 is zeroed out and now identified as the count for week 0. Alternatively, the counts for each of the weeks 0-3 may be individually transferred to become the counts for weeks 1-4, with the count for week 0 starting again at 0. This approach may be used similarly to accumulate other counts for longer time periods, such as for months, years, etc. In one example, FIG. 5 depicts counts for 6 months because music advertisers have indicated an interest in monthly data only for the last 6 months, but 12 months of counts may be accumulated. Likewise, FIG. 5 depicts counts for only two years, the current year, "year 0" and last year, "year 1," but counts for other years may be accumulated. In an embodiment, the counts within each time category are accumulated independently of other time categories. For example, day counts are accumulated in the day 0 count, week counts are accumulated in a week 0 count, month counts are accumulated in a month 0 count, and year counts are accumulated in a year 0 count. When a new day begins, the day 0 count becomes associated with the day 1 count, and the day 0 count begins accumulating from zero in the new day. When a new week begins, the week 0 count becomes associated with the week 1 count, and the week 0 count begins accumulating from zero in the new week. When a new month begins, the month 0 count becomes associated with the month 1 count, and the month 0 count begins accumulating from zero in the new month. When a new year begins, the year 0 count becomes associated with the year 1 count, and the year 0 count begins accumulating from zero in the new year. Other solutions may readily suggest themselves to those skilled in the art.

The communication service provider may use the history 500 for a customer device to detect trends in device usage. Advertisers may want to specifically target device users who are beginning to visit a specific category of web page more frequently because such visitors may be inclined to make purchases via the specific category of web pages because this type of visitors may be less likely to have already purchased the goods or services offered by the category of web pages.

Figure 6:
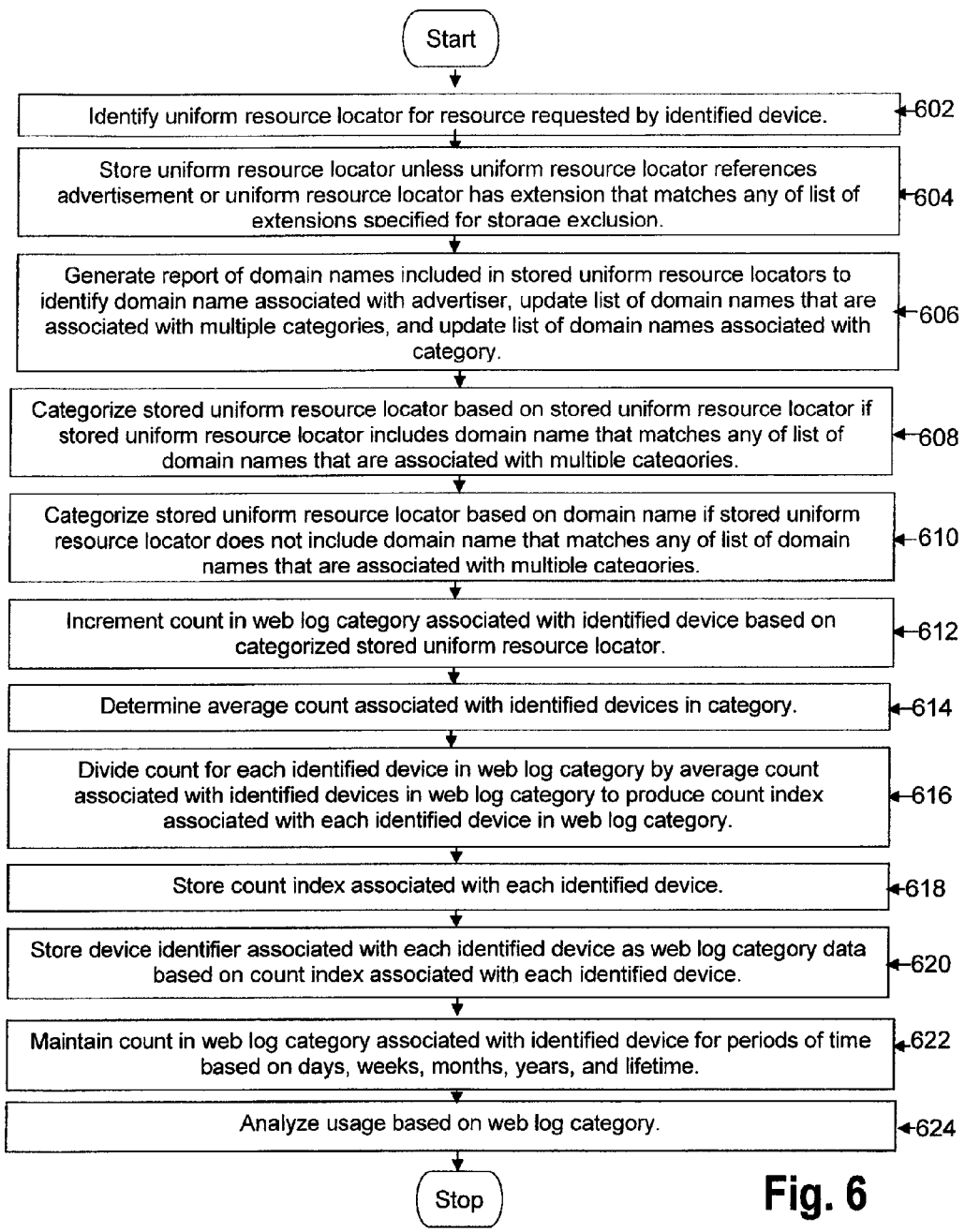
FIG. 6 is a flowchart of a method for web log filtering according to some embodiments of the present disclosure.

FIG. 6 is a flowchart illustrating a method for web log filtering according to some embodiments of the present disclosure. Executing the method enables a server to determine the categories of resources requested by a device, record the categories in web logs, and assist targeting advertising by analyzing the usage of the device based on the web logs.

In box 602, a URL is identified for a resource requested by an identified device. For example, the server 112 identifies a company.ext URL for a web page requested by the device 102. Although the company.ext web page may also include the companystorelocator.ext 202 URL and the company.ext/mr/aboutcompany.do 204 URL, the server 112 analyzes each URL individually.

In box 604, the URL is stored unless the URL references an advertisement or the URL has an extension that matches any of a list of extensions specified for storage exclusion. Examples of extensions specified for storage exclusion may include, for example, extensions associated with joint photographic experts group (JPEG), progressive graphics file (PGF), tagged image file format (TIFF), portable network graphics (PNG), graphic interchange format (GIF), and audio file formats. The company.ext URL does not reference any advertisement if the company.ext URL does not include a key word that matches a list of keywords associated with any advertisement and the URL does not include a domain name that matches a list of domain names associated with an advertiser. For example, many advertisement URLs include the keyword "ad." Therefore, URLs containing the "ad" substring are not stored. Additionally, many advertisement URLs include the domain name of an advertiser or the domain name of a third party associated with advertisers. Therefore, URLs containing the name of advertisers are not stored. The list of extensions specified for storage exclusion may include extensions that indicate that the resource is a picture, an image, an audio file, a script, or a cascaded style sheet. The process of requesting a web page may include the process of requesting a number of unsolicited resources, such as pictures and images. Therefore, the server 112 does not store requested URLS that end with extensions that indicate pictures and images because URLs with these extensions may not indicate the intent of a device user for the purposes of targeted advertising. If the URL references an advertisement or if the URL has an extension that matches any of a list of extensions specified for storage exclusion, the server 112 does not store the URL. Continuing the example, the server 112 stores the company.ext URL because the company.ext URL does not reference an advertisement and the company.ext URL does not have an extension that matches any of a list of extensions specified for storage exclusion.

In box 606, a report of domain names included in stored URLs is generated to identify the domain name associated with the advertiser, update the list of domain names that are associated with multiple categories, and update the list of domain names associated with a single category. The identified domain names are compared to the list used in box 604 of domain names associated with advertisers. If any of the identified domain names are missing from the list of domain names, the missing domain names are added to the list. Additionally, the report of domain names enables the list of domain names that are associated with multiple categories to be updated. For example, if a website for a domain name previously associated with a single category diversifies, such that visits to the website may indicate different categories of interest, the domain name may be added to the list of domain names that are associated with multiple categories. Furthermore, the report of domain names enables the list of domain names that are associated with a single category to be updated. For example, if a new website for a new domain name is identified in the report, the domain name may be added to the list of domain names that are associated with a single category. The server 112 generates the domain name report occasionally to maintain the benefits of not storing URLs with domain names associated with advertisers, as these domain names change over time, and to update the lists of domain names associated with categories based on identified categories of interest.

In box 608, the stored URL is categorizing based on the stored URL if the stored URL includes a domain name that matches any of a list of domain names that are associated with multiple categories. For example, the server 112 parses the stored company.ext/business 302 URL from left to right and matches the company.ext portion of the stored 302 URL to one of the list of URL portions associated with multiple categories. Due to the match, the server 112 categorizes the stored company.ext/business 302 URL based on the stored company.ext/business 302 URL, which includes the sub-domain "/business." All of the URLs 302-306 include the domain name company.ext, which is associated with multiple categories. Although the URLs 302 and 304 begin with the domain name company.ext, only advertisers associated with the category business services may be interested in visitors that select the company.ext./business 302 URL while only advertisers associated with the category career services may be interested in visitors that select the company.ext/careers 304 URL. Therefore, the domain name company.ext is associated with multiple categories, including business services and career services. Because the company.ext domain name is associated with multiple categories, any URL containing the company.ext domain name is further parsed to determine whether a portion of the URL matches a list of URL portions, such as "/business" and "/careers," associated with categories for the company.ext domain name. Due to the parsing method, the server may match a portion of the URL that precedes the domain name, such as "investors" for investors.company.ext 308, to a list of URL portions associated with a category, such as the category investor services. The portion of the stored company.ext/business 302 URL may be a sub-domain, such as "/business," that is associated with the category business services.

In box 610, the stored URL is categorized based on the domain name otherwise. For example, the server 112 categorizes the stored news.ext 312 URL based on the domain name by parsing the stored news.ext URL to match the domain name to one of the list of domain names associated with only one category. In contrast to domain names associated with multiple categories, only advertisers associated with the category news services may be interested in visitors that select the news.ext 312 URL, regardless of which characters follow "news.ext" in the URL. Therefore, a domain name within a URL, such as company.ext or news.ext 312, is first compared to a list of domain names that are associated with multiple categories. Only domain names that do not match a list of domain names that are associated with multiple categories are categorized based on the domain name alone. In these examples, because company.ext is associated with both the business category and the career category, categorizing company.ext requires the matching of portions of the entire URL, such as a sub-domain. In contrast, because news.ext 312 is associated with only the news category, the news.ext URL is categorized as news based on the domain name alone.

Because some URLs include a lengthy string of characters, the server 112 may parse the URL until the server recognizes a domain name or until the server 112 determines that the URL does not include a recognized domain name. In this example, the domain name news.ext is associated only with the category news service. The lists of domain names associated with a single category and multiple categories do not include a domain name associated with a transcoder. Therefore, any parsing that produces the domain name for a transcoder will not result in a category match, but will result in continued parsing until the domain name for the resource that the device user actually requested has been parsed and identified.

In box 612, a count is incremented in a web log category associated with the identified device based on the categorized stored URL. For example, the server 112 increments a count in a business services web log associated with the device 102 based on the categorized company.ext/business 302 URL. In another example, the server 112 increments a count in a news service web log associated with the device 102 based on the categorized news.ext 312 URL. The server 112 may increment a count in a web log for a general category, such as the distribution 400 for all career services web pages, and increment a count in a category for an individual device, such as the history 500 for a specific identified device. The count may be a purchase amount. For example, instead of counting the comparative frequency of how often a device visited music-oriented web pages, in some embodiments where the information is available, the web log may count the purchase amounts made by the device while visiting music-oriented web pages.

In box 614, an average count is determined in the web count category associated with identified devices. For example, the server 112 determines an average count in the business web count category associated with devices 102. In another example, the server 112 determines an average purchase amount in the music category associated with devices 102.

In box 616, the count in the web log category associated with each identified device is divided by the average count to produce a count index in the web log category associated with each identified device. For example, the server 112 divides the count in the business web log category associated with each device 102 by the average count in the business web count category to produce a count index in the business web log category associated with each device 102. The distribution 400 depicts how the count indexes may be determined, such as the index number 404 column that corresponds to the various ranges of comparative percentages listed in the index description 406 column. The server 112 may also compare the total purchase amounts for each device while visiting music-oriented web pages to the average purchase amounts for other devices while visiting music-oriented web pages. By comparing purchases, the server 112 may produce a purchase index that is similar to the count index depicted in FIG. 4.

In box 618, the count index is stored in the web log category associated with each identified device. For example, the server 112 stores the count index in the business services web log associated with each device 102, similar to the distribution 400. In another example, the server 112 stores the purchase index in the music category associated with the device 102, similar to the history 500.

In box 620, a device identifier associated with each identified device is stored as web log category data based on the count index associated with each identified device. For example, the server 112 stores a unique device 102 identifier associated with each device 102 as web log category data, such as the identifiers in the identified devices 408 column, based on the count index, such as the index number 404, associated with each device 102. Although not depicted in FIG. 4, the web log category data in the distribution 400 may also include the average count associated with the identified devices, a maximum count associated with the identified devices, a minimum count associated with the identified devices, a total count associated with the identified devices, and a number of the identified devices. Advertisers interested in a particular category may use this web log category data to determine how many devices to target in an unsolicited advertising campaign by determining the total number of devices that visited a particular category of web page and the comparative frequency of visits by each of these devices.

In box 622, the count in the web log category associated with the identified device is maintained for periods of time based on days, weeks, months, years, and lifetime. For example, the server 112 maintains the count in the business services web log associated with the device 102 for periods of time based on days, weeks, months, years, and lifetime. In another example, the server 112 maintains the purchase amount in the music web log associated with the device 102 for periods of time based on days, weeks, months, years, and lifetime.

In box 624, a usage is analyzed based on the web log category, wherein the usage is at least one of a usage of an identified device and a usage of a website associated with the URL. For example, the server 112 analyzes a usage of the device 102 based on the web log categories. The server 112 may provide an analysis of the usage to a website server when the device 102 accesses a web page serviced by the website server. The website server may use the analysis to select the supplemental advertisement that the website server provides with the web page to the device 102. Alternatively, the server 112 may select an advertisement based on the analysis to supplement the web page provided to the device 102. Additionally, the server 112 may also enable an advertiser to target the device 102 with an unsolicited advertisement based on the analysis of the usage. For example, the server 112 may provide an analysis of the history 500 to a music advertiser because trends indicate the device 102 is progressively visiting more music-oriented web pages, a favorable tendency identified by the music advertiser.

In another example, the server 112 analyzes a usage of the website associated with the URL based on the web log categories. The server 112 may provide an analysis of the usage to a website server about the collection of devices 102 that access a web page serviced by the website server. For example, the analysis may indicate how many of the devices 102 access a music-oriented web page for the first time, how many of the devices 102 access the web page on a daily basis, and how many of the devices 102 visit music-oriented web pages at a rate that is at least 500% compared to the average number of visits by other devices 102 to music-oriented web pages. Furthermore, the server 112 may also provide to the website server the same analysis of other music-oriented web pages associated with other websites. Comparing the analysis of the website to the analysis of similar websites may assist both the website provider and potential advertisers in evaluating the effectiveness of the website in attracting access by types of device users. For example, an advertiser that plans on targeting devices 102 that visit music-oriented web pages at a rate that is at least 500% compared to the average number of visits by other devices 102 to music-oriented web pages may use this comparison in determining which websites to use for advertising purposes. In another example, the website provider may use this comparison to evaluate a marketing campaign designed to attract device users who infrequently access music-oriented web pages to a new music-oriented web page.

Figure 7:
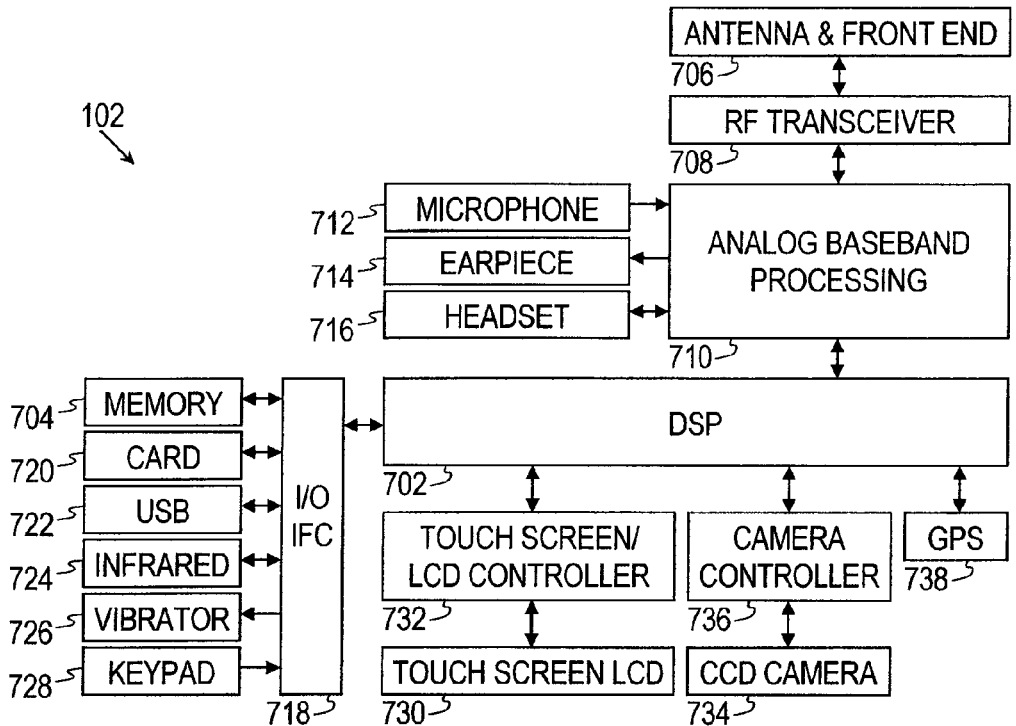
FIG. 7 is a block diagram of an illustrative mobile device according to some embodiments of the present disclosure.

FIG. 7 shows a block diagram of the device 102. While a variety of known components of devices 102 are depicted, in an embodiment a subset of the listed components and/or additional components not listed may be included in the device 102. The device 102 includes a digital signal processor (DSP) 702 and a memory 704. As shown, the device 102 may further include an antenna and front end unit 706, a radio frequency (RF) transceiver 708, an analog baseband processing unit 710, a microphone 712, an earpiece speaker 714, a headset port 716, an input/output interface 718, a removable memory card 720, a universal serial bus (USB) port 722, an infrared port 724, a vibrator 726, a keypad 728, a touch screen liquid crystal display (LCD) with a touch sensitive surface 730, a touch screen/LCD controller 732, a charge-coupled device (CCD) camera 734, a camera controller 736, and a global positioning system (GPS) sensor 738. In an embodiment, the device 102 may include another kind of display that does not provide a touch sensitive screen. In an embodiment, the DSP 702 may communicate directly with the memory 704 without passing through the input/output interface 718.

The DSP 702 or some other form of controller or central processing unit operates to control the various components of the device 102 in accordance with embedded software or firmware stored in memory 704 or stored in memory contained within the DSP 702 itself. In addition to the embedded software or firmware, the DSP 702 may execute other applications stored in the memory 704 or made available via information carrier media such as portable data storage media like the removable memory card 720 or via wired or wireless network communications. The application software may comprise a compiled set of machine-readable instructions that configure the DSP 702 to provide the desired functionality, or the application software may be high-level software instructions to be processed by an interpreter or compiler to indirectly configure the DSP 702.

The antenna and front end unit 706 may be provided to convert between wireless signals and electrical signals, enabling the device 102 to send and receive information from a cellular network or some other available wireless communications network or from a peer device 102. In an embodiment, the antenna and front end unit 706 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 706 may include antenna tuning and/or impedance matching components, RF power amplifiers, and/or low noise amplifiers.

The RF transceiver 708 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast fourier transforming (IFFT)/fast fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 710 and/or the DSP 702 or other central processing unit. In some embodiments, the RF transceiver 708, portions of the antenna and front end 706, and the analog baseband processing unit 710 may be combined in one or more processing units and/or application specific integrated circuits (ASICs).

The analog baseband processing unit 710 may provide various analog processing of inputs and outputs, for example analog processing of inputs from the microphone 712 and the headset 716 and outputs to the earpiece 714 and the headset 716. To that end, the analog baseband processing unit 710 may have ports for connecting to the built-in microphone 712 and the earpiece speaker 714 that enable the device 102 to be used as a cell phone. The analog baseband processing unit 710 may further include a port for connecting to a headset or other hands-free microphone and speaker configuration. The analog baseband processing unit 710 may provide digital-to-analog conversion in one signal direction and analog-to-digital conversion in the opposing signal direction. In some embodiments, at least some of the functionality of the analog baseband processing unit 710 may be provided by digital processing components, for example by the DSP 702 or by other central processing units.

The DSP 702 may perform modulation/demodulation, coding/decoding, interleaving/deinterleaving, spreading/despreading, inverse fast fourier transforming (IFFT)/fast fourier transforming (FFT), cyclic prefix appending/removal, and other signal processing functions associated with wireless communications. In an embodiment, for example in a code division multiple access (CDMA) technology application, for a transmitter function the DSP 702 may perform modulation, coding, interleaving, and spreading, and for a receiver function the DSP 702 may perform despreading, deinterleaving, decoding, and demodulation. In another embodiment, for example in an orthogonal frequency division multiplex access (OFDMA) technology application, for the transmitter function the DSP 702 may perform modulation, coding, interleaving, inverse fast fourier transforming, and cyclic prefix appending, and for a receiver function the DSP 702 may perform cyclic prefix removal, fast fourier transforming, deinterleaving, decoding, and demodulation. In other wireless technology applications, yet other signal processing functions and combinations of signal processing functions may be performed by the DSP 702.

The DSP 702 may communicate with a wireless network via the analog baseband processing unit 710. In some embodiments, the communication may provide Internet connectivity, enabling a user to gain access to content on the Internet and to send and receive e-mail or text messages. The input/output interface 718 interconnects the DSP 702 and various memories and interfaces. The memory 704 and the removable memory card 720 may provide software and data to configure the operation of the DSP 702. Among the interfaces may be the USB port 722 and the infrared port 724. The USB port 722 may enable the device 102 to function as a peripheral device to exchange information with a personal computer or other computer system. The infrared port 724 and other optional ports such as a Bluetooth interface or an IEEE 802.11 compliant wireless interface may enable the device 102 to communicate wirelessly with other nearby devices and/or wireless base stations.

The input/output interface 718 may further connect the DSP 702 to the vibrator 726 that, when triggered, causes the device 102 to vibrate. The vibrator 726 may serve as a mechanism for silently alerting the user to any of various events such as an incoming call, a new text message, and an appointment reminder.

The keypad 728 couples to the DSP 702 via the interface 718 to provide one mechanism for the user to make selections, enter information, and otherwise provide input to the device 102. Another input mechanism may be the touch screen LCD 730, which may also display text and/or graphics to the user. The touch screen LCD controller 732 couples the DSP 702 to the touch screen LCD 730.

The CCD camera 734 enables the device 102 to take digital pictures. The DSP 702 communicates with the CCD camera 734 via the camera controller 736. The GPS sensor 738 is coupled to the DSP 702 to decode global positioning system signals, thereby enabling the device 102 to determine its position. In another embodiment, a camera operating according to a technology other than charge coupled device cameras may be employed. Various other peripherals may also be included to provide additional functions, e.g., radio and television reception.

Figure 8:
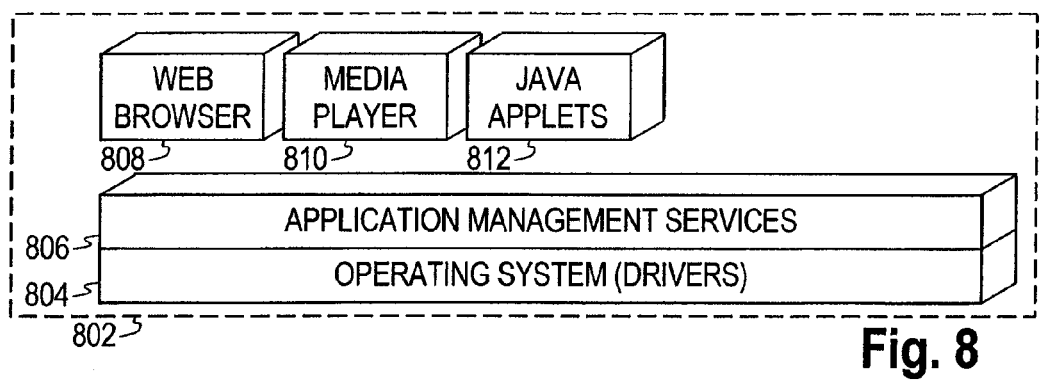
FIG. 8 is a block diagram of an illustrative software configuration for a mobile device according to some embodiments of the present disclosure.

FIG. 8 illustrates a software environment 802 that may be implemented by the DSP 702. The DSP 702 executes operating system drivers 804 that provide a platform from which the rest of the software operates. The operating system drivers 804 provide drivers for the device 102 hardware with standardized interfaces that are accessible to application software. The operating system drivers 804 include application management services ("AMS") 806 that transfer control between applications running on the device 102. Also shown in FIG. 8 are a web browser application 808, a media player application 810, and JAVA applets 812. The web browser application 808 configures the device 102 to operate as a web browser, allowing a user to enter information into forms and select links to retrieve and view web pages. The media player application 810 configures the device 102 to retrieve and play audio or audiovisual media. The JAVA applets 812 configure the device 102 to provide games, utilities, and other functionality.

Figure 9:
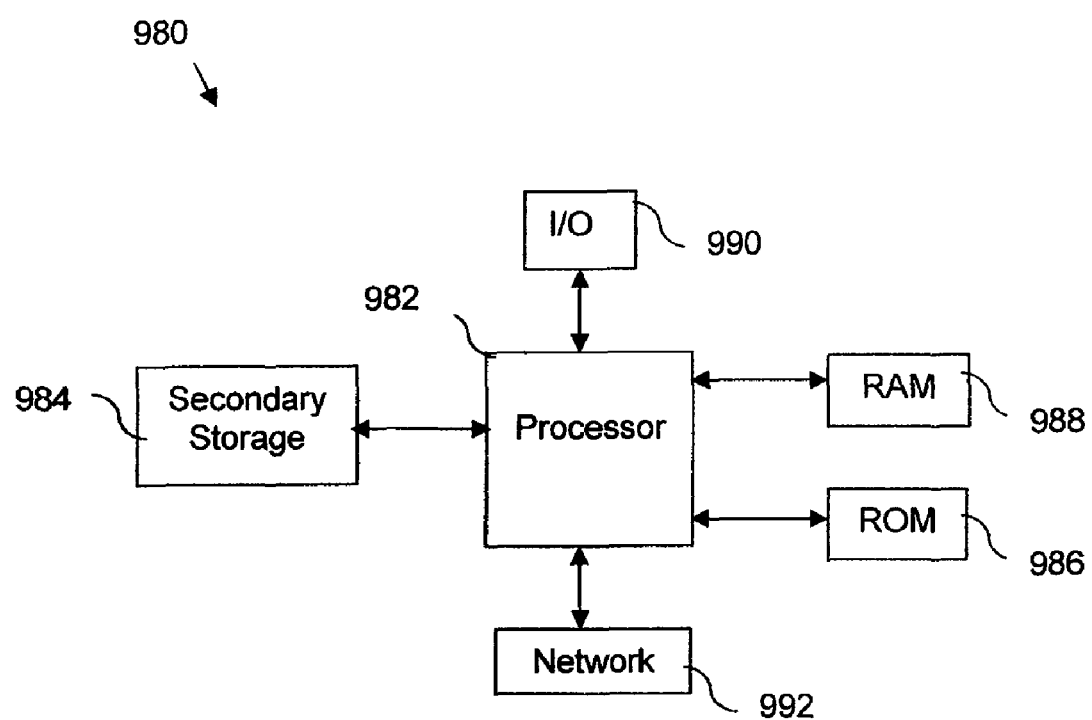
FIG. 9 illustrates an exemplary general purpose computer system suitable for implementing the several embodiments of the disclosure.

The system described above may be implemented on any general-purpose computer with sufficient processing power, memory resources, and network throughput capability to handle the necessary workload placed upon it. FIG. 9 illustrates a typical, general-purpose computer system suitable for implementing one or more embodiments disclosed herein. The computer system 980 includes a processor 982 (which may be referred to as a central processor unit or CPU) that is in communication with memory devices including secondary storage 984, read only memory (ROM) 986, random access memory (RAM) 988, input/output (I/O) devices 990, and network connectivity devices 992. The processor may be implemented as one or more CPU chips.

The secondary storage 984 is typically comprised of one or more disk drives or tape drives and is used for non-volatile storage of data and as an over-flow data storage device if RAM 988 is not large enough to hold all working data. Secondary storage 984 may be used to store programs which are loaded into RAM 988 when such programs are selected for execution. The ROM 986 is used to store instructions and perhaps data which are read during program execution. ROM 986 is a non-volatile memory device which typically has a small memory capacity relative to the larger memory capacity of secondary storage. The RAM 988 is used to store volatile data and perhaps to store instructions. Access to both ROM 986 and RAM 988 is typically faster than to secondary storage 984.

I/O devices 990 may include printers, video monitors, liquid crystal displays (LCDs), touch screen displays, keyboards, keypads, switches, dials, mice, track balls, voice recognizers, card readers, paper tape readers, or other well-known input devices. The network connectivity devices 992 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 992 may enable the processor 982 to communicate with an Internet or one or more intranets. With such a network connection, it is contemplated that the processor 982 might receive information from the network, or might output information to the network in the course of performing the above-described method steps. Such information, which is often represented as a sequence of instructions to be executed using processor 982, may be received from and outputted to the network, for example, in the form of a computer data signal embodied in a carrier wave Such information, which may include data or instructions to be executed using processor 982 for example, may be received from and outputted to the network, for example, in the form of a computer data baseband signal or signal embodied in a carrier wave. The baseband signal or signal embodied in the carrier wave generated by the network connectivity devices 992 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 982 executes instructions, codes, computer programs, scripts which it accesses from hard disk, floppy disk, optical disk (these various disk based systems may all be considered secondary storage 984), ROM 986, RAM 988, or the network connectivity devices 992.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A computer implemented method for web log filtering, comprising:

identifying by a communication service provider server a uniform resource locator (URL) for a resource on a web server requested by an identified device that is serviced by the communication service provider;

storing the URL unless the URL has at least one of a reference to an advertisement and an extension that matches any of a list of extensions specified for storage exclusion;

when the stored URL includes a domain name that is associated with multiple categories, categorizing the stored URL based on a portion of the URL that is associated with one of the multiple categories associated with the domain name;

when the stored URL includes a domain name that is associated with only one category, categorizing the stored URL based on the domain name that is associated with only one category;

incrementing a count in a web log category associated with the identified device based on the categorized stored URL; and storing a device identifier associated with each identified device as web log category data, wherein the web log category data includes the average count associated with the identified devices, a maximum count associated with the identified devices, a minimum count associated with the identified devices, a total count associated with the identified devices, and a number of the identified devices.

2. The computer implemented method of claim 1, wherein the extensions specified for storage exclusion indicates that the resource is at least one of a picture, an image, an audio file, a script, and a cascaded style sheet.

3. The computer implemented method of claim 1, wherein the URL has the reference to the advertisement if the URL includes at least one of a key word associated with an advertisement and a domain name associated with an advertiser.

4. The computer implemented method of claim 3, further comprising generating a report of domain names included in stored URLs to identify the domain name associated with the advertiser and to update a list of domain names that are associated with multiple categories.

5. The computer implemented method of claim 1, further comprising parsing the stored URL from left to right to determine whether a portion of the stored URL matches a domain name in a list of domain names.

6. The computer implemented method of claim 1, further comprising:
maintaining the count in the web log category associated with the identified device for periods of time based on days, weeks, months, years, and lifetime.

7. The computer implemented method of claim 1, further comprising:
dividing the count in the web log category associated with each identified device by an average count in the web log category associated with identified devices to produce a count index in the web log category associated with each identified device; and
storing the count index in the web log category associated with each identified device.

8. The computer implemented method of claim 7, wherein the storing the device identifier associated with each identified device as web log category data is based on the count index associated with each identified device.

9. A system for web log filtering, comprising:
a database; and
a server configured to identify a URL for a resource requested by an identified device,
the server further configured to store the identified URL in the database when the URL does not have either a reference to an advertisement or an extension that matches any of a list of extensions specified for storage exclusion,
the server further configured to filter the identified URL from storage in the database when the URL has either a reference to an advertisement or an extension that matches any of a list of extensions specified for storage exclusion,
the server further configured, when the stored URL includes a domain name that is associated with multiple categories, to categorize the stored URL based on a portion of the URL that is associated with one of the multiple categories,
the server further configured, when the stored URL includes a domain name that is associated with only one category, to categorize the stored URL based on the domain name that is associated with only one category, the server further configured to increment a count in the database for a web log category associated with the identified device based on the categorized stored URL; and
the server further configured to store a device identifier associated with each identified device as web log category data, wherein the web log category data includes the average count associated with the identified devices, a maximum count associated with the identified devices, a minimum count associated with the identified devices, a total count associated with the identified devices, and a number of the identified devices.

10. The system of claim 9, wherein the server is further configured to parse the stored URL to match a portion of the stored URL to any of a list of portions associated with a category.

11. The system of claim 10, wherein the portion of the stored URL is a sub-domain that is associated with the category.

12. The system of claim 9, wherein the server is further configured to parse the stored URL to match the domain name to a domain name in a list of domain names associated with a category.

13. The system of claim 12, wherein the server is further configured to generate a report of domain names included in stored URLs to update the list of domain names associated with the category.

14. The system of claim 9, wherein the count is a purchase amount.

15. The system of claim 9, wherein the list of extensions specified for storage exclusion comprises extensions associated with joint photographic experts group (JPEG), progressive graphics file (PGF), tagged image file format (TIFF), portable network graphics (PNG), graphic interchange format (GIF), and audio file formats.

16. The system of claim 9 wherein the identified device is one of a personal computer, a mobile telecommunication device, a mobile handset, a personal digital assistant, a mobile computer, a handheld gaming device, a wireless mobile device, a pager, a portable computer, a tablet computer, a laptop computer, a digital camera, a digital music player, a set-top box, and a digital calculator.

17. A computer implemented method for web log filtering, comprising:
when a URL includes a domain name that is associated with multiple categories, categorizing the URL based on a portion of the URL that is associated with one of the multiple categories;
when the URL includes a domain name that is associated with only one category, categorizing the URL based on the domain name that is associated with only one category;
incrementing a count in a web log category associated with an identified device based on the categorized URL;
analyzing a usage based on the web log category, wherein the usage is at least one of a usage of an identified device and a usage of a website associated with the URL; and
storing a device identifier associated with each identified device as web log category data, wherein the web log category data includes the average count associated with the identified devices, a maximum count associated with the identified devices, a minimum count associated with the identified devices, a total count associated with the identified devices, and a number of the identified devices.

18. The computer implemented method of claim 17, wherein analyzing the usage of the identified device based on the web log category comprises at least one of providing analysis of the usage to a resource when the identified device accesses the resource and selecting an advertisement for a requested resource based on analysis of the usage.

19. The computer implemented method of claim 17, wherein analyzing the usage of the identified device based on the web log category comprises enabling an advertiser to target the identified device with an unsolicited advertisement based on analysis of the usage.

* * * * *